Feb. 15, 1927.

L. A. FOOTE 1,618,124

SYSTEM OF ACCRUAL ACCOUNTING

Filed June 30, 1921          6 Sheets-Sheet 1

Fig. 1.

Fig. 8.

Lewis A. Foote  INVENTOR

BY W. B. Whitney

ATTORNEY

Feb. 15, 1927. 1,618,124
L. A. FOOTE
SYSTEM OF ACCRUAL ACCOUNTING
Filed June 30, 1921    6 Sheets-Sheet 2

Lewis A. Foote INVENTOR

BY W. B. Whitney
ATTORNEY

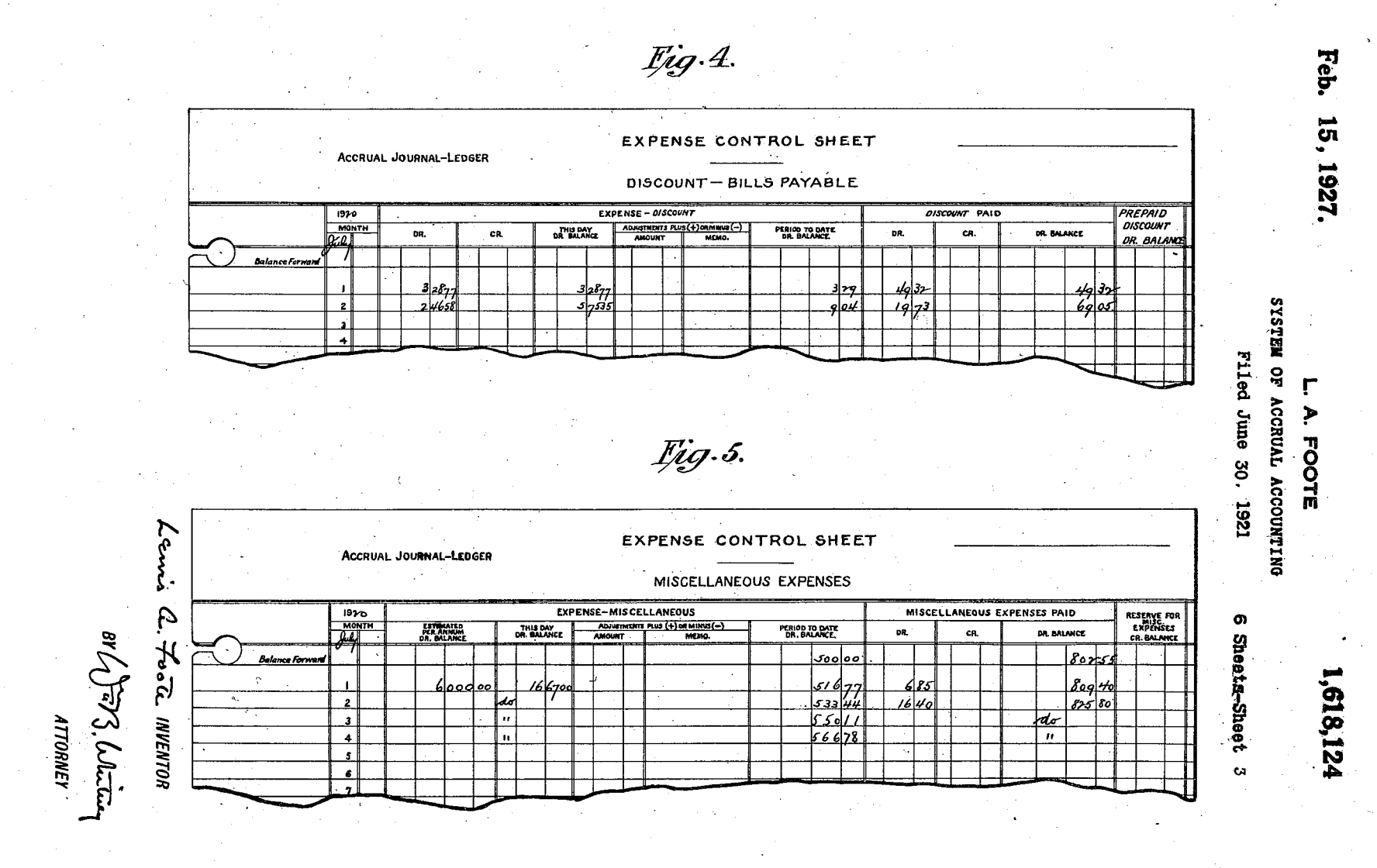

Feb. 15, 1927.

L. A. FOOTE 1,618,124

SYSTEM OF ACCRUAL ACCOUNTING

Filed June 30, 1921  6 Sheets-Sheet 3

Feb. 15, 1927.

L. A. FOOTE

SYSTEM OF ACCRUAL ACCOUNTING

Filed June 30, 1921

REGISTER OF NOTES AND BILLS DISCOUNTED

| DATE OF DISCOUNT | NOTE No. | AMOUNT PRINCIPAL | RATE | DUE DATE | No OF DAYS | DAILY ERNINGS | DISCOUNT RECEIVED | ACCRUAL ADJUSTMENTS (PLUS or MINUS) |
|---|---|---|---|---|---|---|---|---|
| 1920 July 1 | 1 | 500 | 6% | July 5 | 4 | .0833 | 33 | |
| July 1 | 2 | 350 50 | 6% | July 5 | 4 | .0585 | 23 | |
| July 1 | 3 | 670 | 6% | July 5 | 4 | .1117 | 45 | |
| | | 1520 50 | | | | .2535 | 1 01 | |
| July 2 | 4 | 200 | 6% | July 6 | 4 | .0333 | 13 | |
| July 2 | 5 | 400 | 5½% | July 6 | 4+1 | .0611 | 30 | + 06 |
| July 2 | 6 | 300 | 5¼% | July 6 | 4+1 | .0438 | 22 | + 04 |
| July 2 | 7 | 137 48 | 7% | July 6 | 4 | .0266 | 11 | |
| | | 1037 48 | | | | .1648 | 76 | + 10 |
| July 3 | 8 | 425 | 7% | July 5 | 2 | .0826 | 17 | |
| July 3 | 9 | 534 70 | 7% | July 5 | 2 | .1040 | 21 | |
| July 3 | 10 | 378 65 | 6% | July 7 | 4 | .0632 | 25 | |
| July 3 | 11 | 800 | 8% | July 7 | 4 | .1778 | 71 | |
| | | 2138 35 | | | | .4276 | 1 34 | |
| July 5 | 12 | 875 83 | 6% | July 8 | 3 | .1460 | 44 | |
| July 5 | 13 | 750 | 6% | July 8 | 3 | .1250 | 38 | |
| July 5 | 14 | 748 90 | 6% | July 8 | 3 | .1250 | 37 | |
| July 5 | 15 | 545 | 7% | July 8 | 3 | .1060 | 32 | |
| July 5 | 16 | 333 50 | 7% | July 8 | 3 | .0649 | 19 | |
| | | 3253 23 | | | | .5669 | 1 70 | |

*Fig. 10.*

| General Ledger Acct. | INCOME AND EXPENSE ACCOUNT | | | (Accrual Journal–Ledger Control) |
|---|---|---|---|---|
| | DATE | DEBIT | CREDIT | CREDIT BALANCE |
| Balance Forward | 1920 | | | (R) 2482 10 |
| | July 1 | 96 20 | 677 91 | (R) 1900 39 |
| | 2 | 37 39 | 236 52 | (R) 1701 26 |

Lewis A. Foote INVENTOR

BY W. B. Whitney

ATTORNEY

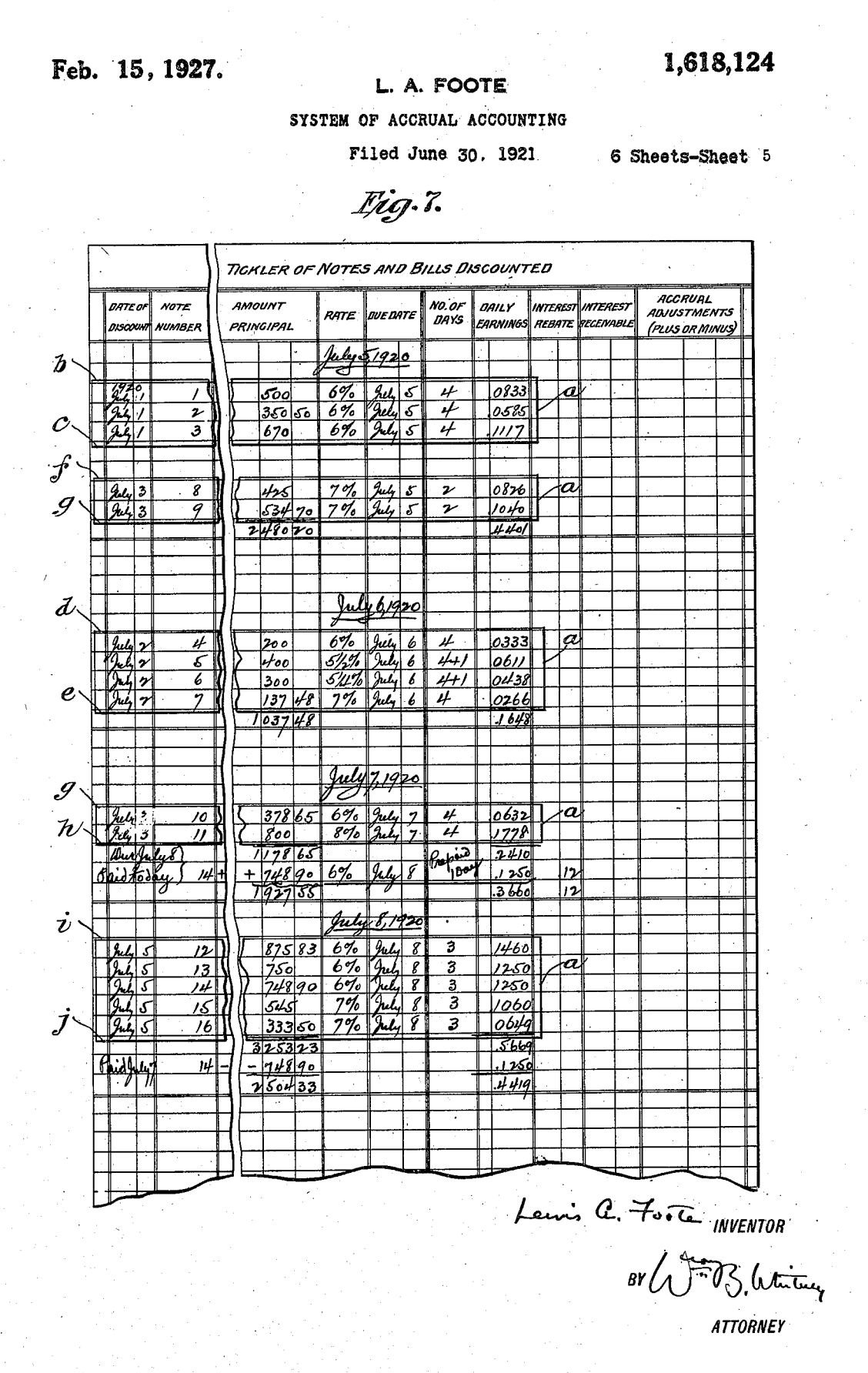

Feb. 15, 1927.

L. A. FOOTE

SYSTEM OF ACCRUAL ACCOUNTING

Filed June 30, 1921

Fig. 7.

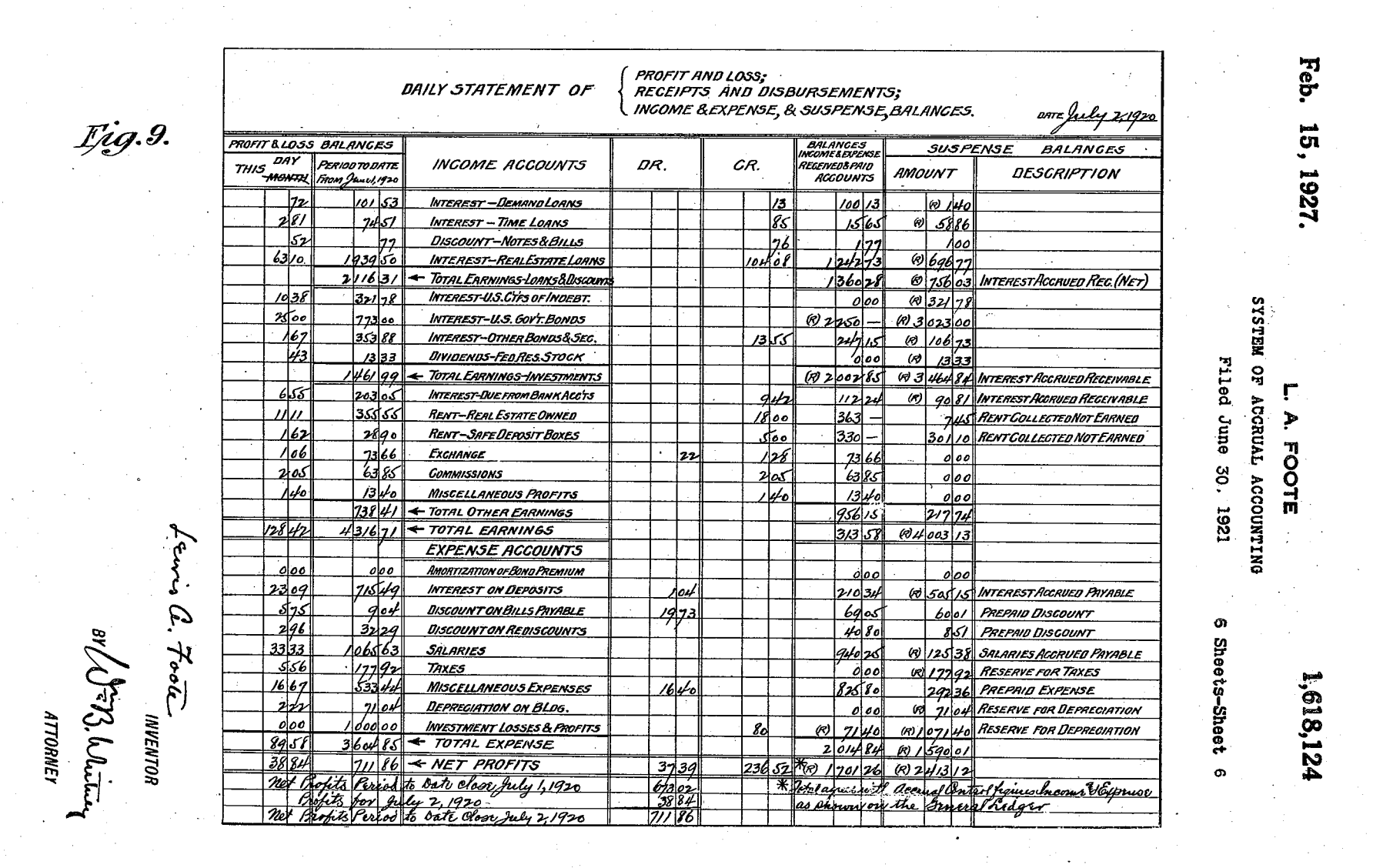

Feb. 15, 1927.

L. A. FOOTE 1,618,124

SYSTEM OF ACCRUAL ACCOUNTING

Filed June 30, 1921 6 Sheets-Sheet 6

Fig. 9.

Lewis A. Foote
INVENTOR

BY W. B. Whitney
ATTORNEY

Patented Feb. 15, 1927.

1,618,124

UNITED STATES PATENT OFFICE.

LEWIS A. FOOTE, OF NEW YORK, N. Y.

SYSTEM OF ACCRUAL ACCOUNTING.

Application filed June 30, 1921. Serial No. 481,484.

The invention relates to a system of accrual accounting, which is designed primarily for use by banking institutions but is readily adaptable to the accounts of brokers, fire and life insurance companies, wholesale, and retail merchants, manufacturers, and business men generally.

An accrual basis for his accounts is recognized as of great value to every business man since, by reflecting the real earnings, it not only enables him at all times to keep in close touch with the true financial condition of his business but also produces figures which are invaluable for comparative statements. But the accrual methods heretofore employed have been ill adapted to the accounts of, and consequently have never been generally adopted by, financial institutions. All prior systems, so far as I am aware, require the carrying of an additional set of accounts, usually in the general ledger, such as accrued, prepaid, unearned, and reserve accounts; and this in turn necessarily involves the making and posting of debit and credit journal entries, daily or periodically, to transfer the current accruals of earnings and expenses to the general ledger, thereby entirely breaking up the cash basis of accounting With the cash basis thus destroyed, it is impracticable for bankers to analyze or check the cash figures in these accounts, as the cash entries are not readily distinguishable from the journal entries. Furthermore, the preparing and posting daily of the many income and expense and adjustment entries not only involve much time and care but is the source of many errors in the accrual work, errors which it is difficult to locate and correct, with the result that the labor and cost involved are out of all proportion to the more or less inaccurate results obtained.

By my present invention, I have obviated these objections and have provided a complete unitary system of accrual accounting, peculiarly adapted to the requirements of financial institutions, large or small, which is at the same time simple, scientific, and accurate, and consequently both economical and practical.

The basic principle upon which the system is founded is the fact that every item of income and expense is subject to division into accrual units of like denomination and constant in value under a fixed rate of interest and readily adjustable to the new rate whenever a rate change occurs. These accrual units are, as applied to income, the one day's earnings on a given principal, and, similarly, as applied to expense, the one day's expense incurred on a given principal.

The system comprises, as one of its main features, the special income and expense control sheets provided for the purpose and the novel method of establishing daily (or for such other unit of time as may be selected) and carrying, on one section of the sheet and in what may be regarded as a memorandum control or accrual account, the accruals of income or expense items both for the current time unit and for the period to date, and, in another or cash section in juxtaposition thereto, the respective received or paid account, also for the current time unit and for the period to date. An additional or third section is preferably provided in which is established and entered, whenever found desirable, a suspense account or balance which, being the difference between the corresponding balances in the accrual and cash sections, represents income unearned or receivable and expense prepaid, payable, or reserves, as the case may be These accounts, both of income and expense, may be carried, under as many or as few classifications as desired, in the general ledger; but, preferably, they are carried under separate cover, subsidary to and under control of the general ledger, in loose-leaf form upon what I have designated as income and expense control sheets—a separate sheet for each classification, including classifications where income is considered as earned when received and expense is treated as incurred when paid and are carried as non-accrual or cash accounts—constituting what is called an Accrual journal-ledger. The accruals in the control accounts are easily established and carried on these control sheets, and the extensions thereof, as well as the extensions in the received and paid accounts, can be quickly and readily verified. Thus, the control or accrual accounts, showing the real earnings and the real expenses, are tied up with the corresponding cash received or paid accounts in such manner as to afford, in addition to a marked economy in time and labor and other advantages, a continuous automatic audit and control of income and expense.

A statement sheet provided for, and the method employed in preparing from the control sheets of the Accrual journal-ledger, a daily, periodic, or occasional, statement covering profit and loss, receipts and disbursements, and suspense balances, constitute another important feature of the system. This statement is made up, daily or as of any desired date, by copying on the statement sheet, opposite the different classifications of both income and expense, the balances shown for that day in the accrual and cash sections of the control sheets of the Accrual journal-ledger, then establishing the suspense balances by uniformly subtracting each accrual period to date balance from the corresponding received or paid balance, and finally footing the several sets of balances and deducting the total footings of the expense classifications from the corresponding total footings of the income classifications. These final balances show the net profit or loss both for the current day or other time unit and for the current period to date, the net of the received and paid balances, and the net of the suspense balances, respectively. The statement can be proved by cross footings, and any error detected thereby can be located by cross-checkings and by checking forward from the last preceding statement. Further, these statements are of great value for purposes of comparison and also afford the basis for the preparation of reports of condition, tax returns, etc., in compliance with the ever increasing and exacting statutory requirements.

The control or accrual accounts carried on the Accrual journal-ledger control sheets are by means of the profit and loss statements tied up with the general ledger without posting these accounts therein, just as closely as if they were actually double posted daily as heretofore. Moreover, the control sheets on which the accrual accounts appear in juxtaposition to the received and paid accounts provide even more information, and with much less work, than is obtained under other accrual systems when the current accrual entries are posted in the general ledger. Accordingly, unless otherwise specially desired, both accrual and received and paid accounts can be, and preferably are, omitted entirely from the general ledger, and only one account, which may be designated as an income and expense account (Accrual journal-ledger control) and which controls the balances of the received and paid accounts in the Accrual journal-ledger, is carried therein. As the result, no postings of accruals to the general ledger are required except for the purpose of closing the books at the end of the fiscal year or period, and then two postings only of totals are necessary.

Other features, subsidiary to the income account for notes and bills discounted carried in the Accrual journal-ledger of a bank, are provided by special sheets for, and the methods of making up, the register and the tickler of such notes and bills.

The system also includes such further features as are hereinafter described, and particularly pointed out in the appended claims.

The invention will be understood by reference to the accompanying drawings in which are shown, by way of illustration merely, the preferred forms for and methods employed in keeping the accounts of a bank or similar institution according to my improved system, and wherein—

Figures 1–5, inclusive, are broken views of five of the control sheets of an Accrual journal-ledger, three for income classifications and two for expense classifications respectively, which have been selected as typical of all these sheets and which with the figures shown thereon illustrate the method employed in the practice of this feature of my system; Figs. 6 and 7 are similar views of sheets for a register and a tickler, respectively, of notes and bills discounted, showing forms for such sheets and the method employed in making the entries thereon, for use in connection with the Income control sheet, Discount—Notes and bills, shown in Fig. 1; Fig. 8 is a view of the upper portion of a sheet for, and with the figures therein illustrated the method employed in, a proof of the several accounts pertaining to income from notes and bills discounted; Fig. 9 is a view of a sheet containing a statement of Profit and loss; Receipts and disbursements; Income and expense, and Suspense balances, illustrating the form of the sheet therefor and the method of preparing such statement from the accounts on the control sheets of the Accrual journal-ledger; and Fig. 10 is a broken view of a sheet for carrying in the general ledger the new combined income and expense account controlling the accounts of the Accrual journal-ledger.

Referring first to the Income control sheet for Discount—Notes and bills, shown in Fig. 1, the sheet, with appropriate headings, is divided in one direction, as by solid lines or in any other suitable manner, into a plurality of horizontal spaces—an upper space for a Balance forward from a preceding sheet, a series of spaces for time unit entries, preferably daily entries for an entire month consecutively numbered at the left, and a space at the bottom for forward footings to be carried to the next sheet. The sheet is further suitably divided, in the other direction, into a Discount earned, or accrual, section, a Discount received, or cash, section, and, preferably also, an Unearned discount balance, or suspense, section; and the first of these sections is sub-divided into Dr., Cr., This day Cr. balance, Adjustments, and Period to date Cr. balance columns, and the second, or cash, section into Dr., Cr., and Cr. balance columns.

On this sheet there are entered, at the close of each day when changes affecting the account have occurred and upon the line provided for that day, in the respective columns of the accrual section, as a Dr. item the accrual unit or one day's earnings on all discounted paper which is paid on that day and so ceases to produce earnings, as a Cr. item the accrual unit or one day's earnings on all new paper discounted which on that day begins to produce earnings, the This day balance which is the difference between the day's debit and credit items added to or substracted from the This day balance of the preceding day, the Adjustments if any, and the Period to date balance which is the This day balance plus or minus the Adjustments added to the Period to date balance of the preceding day, and, in the respective columns of the cash section, as a Dr. item the rebates if any, as a Cr. item the discount received that day, and, in the third or suspense section, whenever desired, the Unearned discount balance, obtained by deducting from the day's Cr. balance of Discount received the day's Discount earned period to date balance.

These accrual units, the one day's earnings or interest, can be established in any convenient manner, as by the use of the special interest tables which I have prepared for the purpose. The credit unit is established, and preferably set up on the register, either by entering opposite each item the one day's interest on that item and taking the day's total of such interest units, or by aggregating paper bearing the same rate of interest and taking the total of the one day's interest entered against each aggregate. The debit unit may be similarly established, and is preferably set up on the tickler. The debits and credits in the Discount received, or cash, section, which represent the day's cash transactions, are likewise preferably taken from the tickler and the register respectively. The adjustments also are preferably originally established on, and taken from, the register or tickler.

On the register sheet shown in Fig. 6, there is provided for the purpose, in addition to the usual columns as for the date, number of note, name of maker, etc., a Daily earnings column or space, in which to enter the one day's earnings of the respective items and foot the total thereof for each day, and an Accrual adjustments column, wherein to enter any plus or minus adjustments. The tickler sheet shown in Fig. 7 is also provided with similar additional Daily earnings and Accrual adjustments columns, and, preferably, with Interest rebate and Interest receivable columns for the entry of such items as rebates made at maturity on account of part payments on unmatured paper and interest not paid or advanced but payable at maturity. The register may be, and for certain purposes preferably is, written up in multiple form by use of carbon paper. Then as illustrated in Figs. 6 and 7, either the original sheet or a carbon copy may be used in making up the tickler by cutting it apart on the line $a$, to remove the two unnecessary right hand columns, and on the lines $b$, $c$, $d$, $e$, $f$, $g$, $h$, $i$, $j$, etc., to separate paper or groups of paper having different maturity dates and pasting or otherwise securing the parts properly grouped together according to maturity date, upon the tickler sheet. A second carbon copy of the register sheet may be made, if desired, for use in making up a liability record for the borrowers. The register kept as here shown provides the means for a ready daily verification both of the discount received and of the accrual units as established since, by simply multiplying the one day's earnings of each paper by the number of days it has to run, the correctness of both sets of figures is established. When the tickler is prepared from a copy of the verified register sheet, it must at all times be correct both as to principal and accrual units. If such details are not desired, however, the accrual units as established can be entered in the special column here provided or elsewhere, as on the margin of or in any available space on the usual register and tickler sheets.

The method of keeping the account of income from notes and bills discounted, here illustrated and shown for convenience as a newly started account, is as follows:

At the close of the first day, July 1, the register shows three notes discounted, all at 6 per cent and having four days to run. The accrual unit of these three notes is established as .2535, either as shown by entering the one day's interest on each note and taking the sum of the three items or by taking the one day's interest on the 1520.50 aggregate of the three notes, and this .2535 is accordingly carried to the Income control sheet and there entered on the July 1 line in the Cr. column of Discount earned. Then, as the tickler shows no payment for the day and as there are no Balances forward, the .2535 is simply carried along on the Income control sheet first to the This day and then to the Period to date Cr. balance column, the last two decimals being dropped in the last extension as they are less than half a cent. The discount shown on the register as received on each of these three notes is also footed, and the 1.01 obtained as the total is likewise carried to the Income control sheet and there entered to the credit of Discount received; and, as there is no debit item for the day and no Balance forward it is extended to the Cr. balance column.

For July 2, the register showing the discount of four notes all payable July 6 but each at a different rate of interest, the one day's earnings of each note is established and entered as shown, and the total thereof, amounting to .1648, is carried as the accrual unit to the Income control sheet and there entered as a credit to Discount earned. The tickler again showing no payment for the day, this credit is added to the .2535 balance of the preceding day and the sum .4183 is entered as the earnings for the day in the This day Cr. balance column. The register, however, shows plus adjustments on two of the notes, on which (as out of town notes) an additional day's interest was collected. The .10 total of these adjustments is entered in the Adjustments column of Discount earned; and the .4183 This day balance, plus the .10 adjustment, is added to the .25 Period to date balance of the preceding day and .77 entered as the sum thereof in the Period to date Cr. balance column. The .76 shown on the register, as the total of the discount received on the four notes is credited to Discount received on the Income control sheet, and, added to the 1.01 balance of the preceding day, 1.77 is entered in the Cr. balance column.

For July 3, the .4276, established on the register as the day's earnings on the four notes shown as discounted at different rates and for different periods on that day, is similarly credited to Discount earned on the Income control sheet and, this credit being added to the preceding day's balance, .8459 is entered as the This day balance. The Period to date balance of 1.62 is then obtained by adding to the .77 balance of the preceding day the This day balance of .85. The 1.34 discount received for the day, shown on the register, is entered on the Income control sheet to the credit of Discount received and, adding it to the 1.77 balance for the preceding day, 3.11 is entered in the Credit balance column.

July 4 is a holiday, and the bank is closed. The This day balance of Discount earned and the Cr. balance of Discount received are therefore the same as for the preceding day. The Period to date balance, however, is 2.47, the This day balance being added to the Period to date balance of the day before.

For July 5 the tickler shows the payment of five notes, and the .4401, which is the footing of the one day's earnings of these notes, is accordingly debited on the Income control sheet to Discount earned. The register shows the discount of five notes, and footings of .5669 for their one day's earnings and 1.70 for the discount received.

These totals are accordingly entered on the Income control sheet to the credit of Discount earned and to the credit of Discount received, respectively. The .9727 This day balance of Discount earned is obtained by adding to the preceding day's balance the .1268 difference between the day's debit and credit items. And this .9727 is added to the Period to date balance of the preceding day to give the 3.44 new Period to date balance. In the Discount received section the 4.81 Cr. balance is obtained by adding the 1.70 credit to the 3.11 balance of the day before. And for the purposes of the proof to be taken, as hereinafter described, the unearned portion of the Discount received is established, as 1.37, by subtracting the 3.44 Period to date balance from the 4.81 received Cr. balance, and entered in the Unearned discount column.

For July 6 the tickler shows the payment of four notes and the footing of their one day's earnings is .1648. This figure is according debited to Discount earned on the Income control sheet, and, as the register shows no bills discounted, the This day balance of the day before is reduced by that amount to .8079, which produces a Period to date balance of 4.25. There being neither debits nor credits to Discount received, the Cr. balance in this section remains as before.

For July 7 the .3660 footing of the one day's earnings of the three notes shown on the tickler as paid on that day is similarly debited on the Income control sheet to Discount earned, and as no new notes have been discounted the This day and Period to date balances are established in the same way as for the day before. The tickler shows, however, that one of the three notes paid is a note due on the following day, and that an interest rebate of .12 was made on account of the pre-payment. This .12 is therefore debited on the Income control sheet to Discount received, and the preceding day's Cr. balance is reduced by that amount to 4.69. This balance in the received, or cash, section being the same as the Period to date accrual balance, all the discount received is shown as now earned.

For July 8 the footing on the tickler of the one day's earnings of the four notes shown as paid on that day is .4419, which is debited on the Income control sheet to Discount earned; and, the notes discounted having all been paid, the This day balance is closed out, and both the Period to date balance and the Cr. balance to Discount received remain as before at 4.69.

Referring now to Fig. 8 of the drawings, the proof of the several accounts pertaining to income from notes and bills discounted, therein illustrated as taken as of the close of July 5, is made from the tickler as follows: The aggregates of the then unpaid notes, as shown on the tickler are 1,037.48 for notes maturing on July 6, 1,178.65 for notes maturing on July 7, and 3,253.23 for notes maturing on July 8. These amounts are entered in a column, an Amount principal column for instance, and, footed up, show 5,469.36 as the total of the unmatured paper. The respective Daily earnings totals applying to these aggregates, shown on the tickler as .1648, .2410, and .5669, are similarly entered in a Daily earnings column, and, footed up, give a total of .9727. In case the itemized daily earnings are not currently carried on the tickler, they should be set up, preferably on the tickler, for the purpose of this proof. Then, as notes have been treated as beginning to earn on the day on which they were discounted and hence produce no earnings on the day of payment, the Days to maturity are 0, 1 and 2 for the paper maturing July 6, 7 and 8, respectively. Therefore, the daily earnings, multiplied by the days to maturity, produce, for entry in an Unearned discount column, 0000 for the July 6 paper, .2410 for the July 7 paper, 1.1338 for the July 8 paper, and a total unearned discount of 1.3748 on all unmatured paper. The total of the amount principal thus obtained should agree with the balance for that day in the bills discounted account on the general ledger. The footings of Daily earnings and of Unearned discount on the proof, which agree with the This day balance in the accrual section and the Unearned discount balance in the suspense section of the Income control sheet, thus prove the correctness of these two balances.

A proof of this kind is also used as the basis for opening the account on an Income control sheet for Discount—Notes and bills, where the account has previously been carried on the books as a non-accrual account or as an accrual account by methods heretofore employed. If carried as a non-accrual account, the cash balance of discount received only would show on the books. The proof produces the daily earnings accrual figures and the unearned discount figure to be set up on the Income control sheet. For example, in setting up on July 5 a control sheet for an account having on that day a credit balance of 4.81 to Discount received, the .9727 total Daily earnings and 1.37 Unearned discount shown on the proof are entered as the July 5 balances in the proper columns in the accrual and cash sections, respectively, of the Control sheet, and the Period to date balance of 3.44 to Discount earned is then established by subtracting the 1.37 from the 4.81. Where previously kept under other accrual methods, the accrual balances for the This day and Period to date columns and the suspense balance for the Unearned discount column should be available from the records. A proof is taken to verify the correctness of these balances, which, after adjustment for any errors disclosed, are set up on the Control sheet, and the Cr. balance in the cash section is then established by adding the earned Period to date balance to the Unearned discount balance.

The Income control sheet for Interest—Due from bank accounts, shown in Fig. 2, is similar to that for Discount—Notes and bills, already described. The three sections into which the sheet is divided bear headings appropriate to the particular classification. In the interest earned or accrual section, however, there is a single column for Balance due from banks, in place of the Dr. and Cr. columns on the discount sheet; also, since in this classification interest is earned before it is received and hence the resulting suspense figures will be a debit balance, representing interest accrued receivable, the column in the suspense section is for convenience used as an Interest accrued receivable Dr. balance column.

In this classification the accrual unit is the one day's earnings, preferably established by the use of the special interest tables referred to, on the daily balances due from other banks as shown on the bank's own books and at the table rate nearest the average of the different rates of interest received on such balances. Thus, in the example here given, the balance due from banks on July 1 is 94,200, and this balance remains the same on the following day. The table rate nearest the average rate of the interest thereon is found to be 2½ per cent. And the one day's earnings on this balance at such rate is 6.5500, which is accordingly entered as the This day balance for both July 1 and July 2 and extended to the Period to date column, on July 1 by adding it to the 189.95 Balance forward in that column and on July 2 by adding it to the 196.50 balance of July 1 thus obtained. In the Interest received or cash section, 81.42 is credited on July 1 and extended to the Credit balance column by adding it to the Balance forward of 21.40 from the preceding sheet, making the entry 102.82 for that day; and on July 2 there is a credit of 9.42, which, extended, gives a credit balance of 112.24. The suspense balance, which for any given date is the difference between the period to date balance of earnings and the credit balance of receipts and hence is 93.68 for July 1 and 90.81 for July 2 in the example given, can be established and entered whenever desired for purposes of proof or otherwise. These two balances being, as already explained, debit balances as usual in this classification, may be entered when desired in the Interest accrued receivable Dr. balance column provided therefor. In case the accrual or earnings balance is less than the received balance, however, the suspense balance for that day will be a credit balance, representing interest received but unearned, and its character as such should be suitably indicated when entered in the Dr. balance column. If the accrual balance in this classification should at any time run less than the received balance, it would indicate that the average interest rate in use was too low, and a new average should be taken and the account adjusted accordingly.

The Income control sheet for exchange, Fig. 3, illustrates the form of control sheet for an income or expense classification which is carried on a non-accrual basis, the income being considered as earned when received or the expense as incurred when paid. On this sheet there is only one, or cash, section, which is divided into appropriately headed Debit, Credit and Credit balance columns. This section is twice repeated, to make use of the entire sheet, as all control sheets are preferably uniform in size.

In the example here shown, there is a debit of .76 and a credit of 3.18 on July 1, and the Cr. balance of 72.60 for the day is established by adding the difference between these debit and credit items, amounting to 2.42, to the 70.18 Balance forward from the preceding sheet. And on July 2 there is a debit of .22 and a credit of 1.28, which items, extended, give a Cr. balance of 73.66 for the day.

The Expense control sheet for Discount—Bills payable, Fig. 4, is the same in form as the Income control sheet for Discount—Notes and bills (Fig. 1). The headings of its three sections are appropriate to the classification, and what were Cr. balance columns on the Income control sheets are here normally Dr. balance columns.

In this account the Expense—Discount, or accrual, section is daily debited and credited, respectively, with the accrual unit or one day's interest on all bills payable which on that day begin, and cease, to be an expense, and the difference between these two items is extended first to the This day and then to the Period to date columns. The Discount paid, or cash, section is similarly debited with the discount paid and credited with any rebates received, and the difference is extended to the Dr. balance column. The suspense balances, being the differences between respective Period to date accrual and Dr. cash balances, are normally debit for this expense classification, since the discount is usually prepaid. These balances are accordingly entered, whenever desired, in the Prepaid discount Dr. balance column provided for the purpose.

Thus, in the example here shown, for July 1 there is a debit of 3.2877 to Expense—Discount, and, as there is no credit for the day and no Balances forward, this same amount is entered both in the This day and the Period to date columns, the last two figures being dropped in the latter column and the preceding 8 raised to 9 as the figures dropped amount to more than half a cent. For the same day, 49.32 is debited to Discount paid, and, as there is no credit for the day and no Balance forward, the same figures are entered in the Dr. balance column. For July 2 the debit to Expense—Discount is 2.4658, and, there being no credit item, is extended by adding it to the This day and the Period to date balances of July 1, making these balances 5.7535 and 9.04, respectively; and the 19.73 debited to Discount paid is similarly extended by adding it to the Dr. balance of July 1, giving a new balance of 69.05. The suspense balances for these two days will be found to be 46.03 and 60.01, respectively.

The Expense control sheet for miscellaneous expenses, Fig. 5, is in form the same as the Income control sheet for Interest—Due from bank accounts (Fig. 2), with appropriate headings for its sections and columns.

For this classification, the estimated total of such expenses for the year, amounting here to 6,000.00, is entered in the Estimated per annum Dr. balance column in the accrual section, and the entry continues the same from day to day until a change in the estimate requires a different entry. The accrual unit or one day's share of such total is 16.6700 in the example given. These figures, preferably obtained from the interest table, are entered in the This day column and extended from day to day to the Period to date column by adding it, on July 1, to the 500.00 Balance forward and, on subsequent days, to the Period to date balance of the preceding day. In the cash section of this account, the debit of 6.85 shown on July 1 is extended to the Dr. balance column by adding it to the 802.55 Balance forward, and the debit of 16.40 on July 2 is similarly extended by adding it to the Dr. balance of 809.40 for July 1. The suspense balances, which for the two days in question will be found to be 292.63 and 292.36, respectively, are debit balances and represent prepaid expenses. Accordingly, whenever entered in the Reserve for Misc. expenses Cr. balance column here provided, the opposite character of these balances should be suitably indicated.

The forms of the control sheets for the other classifications of income and expense under which the business of a bank is carried, and the methods of keeping the accounts thereon, are similar to one or the other of those here illustrated and need not be described.

The method of opening the accounts upon the different control sheets is similar to that already described for starting the Income control sheet for Discount—Notes and bills. Where the books have previously been kept on a cash basis, the accrual units of earnings and expense and the suspense balances of income earned receivable or received but unearned and the expense accrued payable, prepaid, or reserves are first established in any suitable manner and set up in the columns provided therefor on the appropriate control sheet. The cash balance available from the records is entered in the cash section of the control sheet, and then the Period to date accrual balance to be entered is established from these two figures; and where the books are already on an accrual basis, the balances to be entered in the cash section of the sheets is established from the accrual and suspense balances obtained from the records.

In some of the classifications—for example, in those of income from bonds which are usually bought at a given price plus accrued interest and in those of expense where a reserve is set aside for depreciation, investment losses, and the like—it will not infrequently happen that the balance to be entered in the Cr. or Dr. balance column of the cash section of a control sheet will be of opposite character to that designated by the heading at the top of the column. This may also occasionally happen in any classification, in a column either in the accrual, cash, or suspense section of the control sheet. In all cases where it does occur, the opposite character of the figures entered should be suitably indicated, preferably by making the entry in red ink. And in adding, subtracting, or multiplying such figures they are to be treated as minus figures, in the usual way.

The Daily statement of profit and loss; Receipts and disbursements; Income and expense, and Suspense balances, shown in Fig. 9, illustrates a complete detailed daily, periodic, or occasional statement prepared, as of the close of July 2, from the various control sheets, including those hereinabove described, covering the different classifications of a bank's accounts, both of income and expense.

The sheet for the statement, providing horizontal spaces for the different income and expense classifications and for the sub-totals, totals and net of balances, is divided into three sections corresponding to those on the control sheets—a Profit and loss balances or accrual section which is sub-divided into two appropriately headed columns for This day or month and Period to date balances, a cash section which has a column for Balances income & expense received & paid accounts and, preferably, also Dr. and Cr. columns for the current day's cash transactions, and a Suspense balances section which in turn is sub-divided into two columns respectively for the Amount and Description of such balances.

In the preparation of a daily or other statement, the entries in the Dr. and Cr. columns of the cash section are preferably made from the current day's records of cash transactions and the footings of these two columns, here shown as 37.39 and 236.52 respectively, serve as journal entries for the general journal, and from there the totals are posted in the new Income and expense accrual control account in the general ledger, shown in Fig. 10 and hereinafter described.

The July 2 This day and Period to date balances in the accrual section and the Cr. balance in the cash section of the various control sheets are copied in the respective columns provided therefor on the statement sheet, the balances from each control sheet on the line assigned to the particular classification of income or expense carried on that sheet; and the Suspense balances are then established, and entered on the statement in the Amount column by uniformly deducting the Period to date accrual balance from the Income & expense received & paid balance of each classification when the corresponding accrual and cash balances are of the same character, both debits or both credits. In case such accrual balance is the lesser of these two balances, the resulting suspense balance will be a plus quantity, representing a balance of the same character as that of the two balances from which it is derived; but, where the accrual balance is greater than the cash balance, the resulting Suspense balance will be a minus quantity, representing a balance of opposite character to that of these two balances. Thus, a plus balance will represent income unearned or expense prepaid, as the case may be, while a minus balance will represent, in case of income, the accrued earnings receivable and, in case of expense, either an accrued expense payable or a reserve. And to readily indicate their character, the figures of plus balances are preferably entered on the statement in black ink and those of minus balances in red ink (indicated on the drawings by an R in parentheses). Where, as on the Income control sheet, Exchange (Fig. 3), the classification is on a non-accrual basis, and as stated the income is treated as earned when received or an expense as incurred when paid, the Cr. balance is entered on the statement in the Period to date column of the accrual section as well as in the Income & expense received & paid column in the cash section; the entry for the This day column of the accrual section is the difference, plus or minus as the case may be, between the cash debit and credit items of the current day; and there will be no Suspense balance. These four columns of balances are then footed for totals, both of the income and of the expense classifications, and the respective expense totals are deducted from the income totals. It is to be observed that in footing plus and minus figures, the total is the difference between the sum of the plus figures and the sum of the minus figures and will be a plus or minus total according to which one of said sums is the greater. The subtractions also will give plus or minus remainders, according to circumstances, as will clearly be understood without further explanation.

Of the net balances obtained, that in the This day column of the accrual section, amounting to 38.84 in the example shown, is the Net profits for the current day. The 711.86 shown as the Period to date balance, in the same section, is the Net profits for the period to date. The (R) 1,701.26 balance in the cash section, here a minus balance, is the net of the Income & expense received & paid balances. And the balance of (R) 2,413.12 in the Amount column of the suspense section, also a minus balance, represents the net of the Suspense balances.

The statement is preferably made up in multiple, to provide copies for the use of different officials; and, more especially, for the auditor who uses it as the basis for his daily or periodic audit and control.

In checking up or verifying the statement, the remainders obtained by deducting the sub-totals, totals, and net of the detailed balances in the Period to date column of the accrual section from the corresponding balances in the Income & expense received & paid column of the cash section should be found to agree, respectively, with the sub-totals, totals, and net of the detailed balances in the Amount column of the suspense section; and, in case an error is thus disclosed in one of the sub-totals, the error will be in one of the classifications included therein and hence readily located. The Net profits of 711.86 here shown for the period to date should be the same as that obtained by adding the Net profits of 38.84 for the current day to the Net profits for the period to date shown on the Daily statement of the preceding day, and when in agreement proves the extensions of the This day balances and adjustments to the Period to date column in the accrual section on all of the control sheets with the same certainty that could be obtained under other accrual methods where these entries are double posted to the so-called nominal and suspense accounts in the general ledger and with the additional assurance that no accrual entry as established in the This day column of the control sheet could possibly have been posted to the wrong classification. And the (R) 1,701.26 net of the Income & expense received & paid balances should agree with the balance for the current day in the Credit balance column of the new Income and expense account in the general ledger, now to be described.

Fig. 10 of the drawings illustrates the new combined Income and expense account (Accrual journal-ledger control) which is opened on the general ledger, usually as a credit balance account, and into which all cash, or accrual and suspense, balances of income and expense heretofore carried on the general ledger or elsewhere in what are known as nominal or suspense accounts are closed, and such accounts are, or may be, thereafter omitted entirely from the general ledger.

For the purpose of this account, the general ledger sheets are suitably ruled, both horizontally and vertically, to provide appropriately headed Date, Debit, Credit, and Credit balance columns in which to make the necessary periodic entries.

After the system has once been put in operation on the income and expense control sheets, the account is readily opened, if books have formerly been kept on a cash basis, by closing thereto all of the income and expense received and paid account balances carried on the general ledger or elsewhere, or, if books have formerly been kept on an accrual basis, by closing thereto all of the period to date, accrual, suspense and non-accrual cash balances of income and expense appearing on the general ledger or elsewhere.

Any proper journal entry may be used as the basis of closing the several balances of income and expense to the new General ledger control account, but preferably the daily statement form, as shown in Fig. 9, is prepared and serves as the journal entry and as the posting medium. The individual period to date accrual, cash, and suspense balances are all shown on the statement and the necessary postings can be readily made in detail to close the respective accounts. The offsetting entries for the new General ledger control account can also be made in detail but are preferably made by posting therein, if books have formerly been kept on a cash basis as a credit, the net of the Received and paid balances; if books have formerly been kept on an accrual basis, as a credit, the net of the Period to date accrual balances and as a debit, the net of the Suspense balances. The difference between the debit and credit entries should be extended and properly indicated in the Credit balance column.

After the account is started, it is debited and credited each day, preferably through the general journal, with daily totals only of income and expense as shown by the Dr. and Cr. columns in the cash section of the statements prepared. The new balance is established by adding to or subtracting from the preceding balance as required, the difference between the current debit and credit items.

It should be noted that if this control account is carried as a credit balance account, red ink figures in the Balance column indicate a debit balance. If the current balance in this account is usually a debit item, the account may be carried as a debit balance account with corresponding heading over the Balance column, in which event a debit balance would be entered therein in black ink; whereas a credit balance would be indicated in red ink.

For example, in the account illustrated, the Balance forward from the preceding sheet is (R) 2,482.10, a debit balance. The postings under date of July 1 are a debit of 96.20 and a credit of 677.91, and the new balance as extended in the Credit balance column is (R) 1,900.39. For July 2 there is a debit of 37.39 and a credit of 236.52, which, as previously explained, were established by the footings of the Dr. and Cr. columns on the daily statement of this date (Fig. 9), and the balance for the day, extended as before, is (R) 1,701.26; which balance is used to control, and being in agreement therewith proves, the net of the balances in the Income & expense received & paid accounts of the cash section of the daily statement and through such statement the several accounts in the Accrual journal-ledger.

As hereinabove explained, it is unnecessary and inadvisable, after the account has once been established in the general ledger, to post any accrual entries thereto except for the purpose of closing the books at the end of a fiscal year.

For closing the books, a complete detailed statement is prepared as of the date of closing. Then, from such statement the net profits shown thereon are posted, preferably through general journal entries, as a debit to the Income and expense account and as an offsetting credit to the Profit & loss account on the general ledger, thus transferring the period's profits from the former to the latter account and closing out all of the supporting Period to date accrual balances and non-accrual cash balances. The newly extended balance of the Income and expense account in the general ledger then agrees with the net of the Suspense balances shown on the statement, and the detailed Suspense balances on the statement, supporting such net balance, become the opening Received and paid balances for the new period for the Income and expense control sheets, the Suspense balance for each classification of income and expense being entered as the Balance forward in the Cr. or the Dr. balance column of the cash section of the appropriate control sheet, red ink figures being entered in red and black ink figures in black. For example, assuming that the books are closed as of the close of July 2, the net profits of 711.86 shown on the daily statement are debited to the Income and expense account in the general ledger, and, deducted from the Credit balance of (R) 1,701.26, gives (R) 2,413.12 as the new Credit balance; and the detailed Suspense balances (R) 1.40, (R) 58.86, 1.00, etc. are respectively entered as the Balances forward in the Cr. balance column of the cash section of the new control sheets for Interest—Demand loans, Interest—Time loans, Discount—Notes and bills, etc. It is apparent, therefore, that if a daily statement was prepared immediately after the closing of the books the detailed Suspense balances shown on the prior statement would be found in the Balances income & expense received & paid column of the new statement, the closing of the books merely shifting these balances from the one column to the other.

A complete detailed statement as shown is required only for the closing of the books, for the preparation of a Liquidating balance sheet, or for reports of condition. Hence, for other statements, the Suspense balances, at least the detailed balances, need not be established as they are unnecessary for the current audit, proof, or comparative purposes.

A Trial balance from the general ledger, when kept under my system, will show the single control Credit balance of the Income and expense account, instead of the detailed cash, or accrual and suspense, balances of the usual nominal accounts.

Further, a liquidating balance sheet can be prepared at any time, working preferably from a general ledger trial balance and a current daily statement, by copying on a form therefor, in liquidating order, the Resources and the Liabilities, Capital, Surplus, and Undivided profits balances as shown on the trial balance and then inserting in their proper places therein, as an offset to the control balance of the Income and expense account which is dropped from the Trial balance, the Net profits for the period to date and the detailed suspense balances shown on the statement.

It is seen that, under my new system, the income and expense accounts are in effect kept on a cash basis—that is to say, that all income received is credited in a series of Received accounts and all expenses paid are debited in a similar series of Paid accounts. These current cash transactions are merged with the opening suspense balances, both for economy of entries and to facilitate the preparation of the statements, but the cash balances in all classifications can readily be obtained, at any time, by merely deducting from the current balances in the Income and expense Received and Paid accounts the respective suspense balances brought forward at the beginning of the period.

The system therefore affords with a minimum of entries a clear-cut and detailed current analysis of all income and expense accounts, both cash and accrual, which, together with the automatic audit and control provided, is invaluable to an auditor or bank examiner and practically eliminates the opportunity for any fraudulent manipulation of the nominal or suspense accounts.

What I claim as new, and desire to secure by Letters Patent, is—

1. An accounts sheet which is provided with appropriately designated columns in which to keep, in juxtaposed accrual and cash sections and on successive lines for successive units of time, the items of an account both on an accrual and a cash basis.

2. An accounts sheet which is provided with appropriately designated columns in which to keep in juxtaposed accrual, cash, and suspense sections respectively and on successive lines for successive units of time, accrual, cash, and suspense accounts.

3. A sheet for an accrual account which is provided with appropriately designated columns for the entry, on successive lines for successive units of time, of accrual balances both for the current time unit and for the period to date and of the corresponding cash transactions both debit and credit for the current time unit and the received/paid balance for the period to date.

4. A sheet for an income/expense accrual account which is provided with appropriately designated columns for the entry, on successive lines for successive units of time, of current accrual units both debit and credit and the balances of such accrual units both current and for the period to date.

5. A sheet for an income/expense accrual account which is provided with appropriately designated columns in which to enter, on successive lines for successive units of time, in an accrual section the current accrual units both debit and credit and the accrual balances both for the current time unit and for the period to date, in a cash section the current cash transactions both debit and credit and the received/paid balance for the period to date, and in a suspense section the appropriate unearned/prepaid, accrued receivable/payable, reserve balance.

6. A sheet for an income/expense accrual account which is provided with appropriately designated sections and columns for the entry, on successive lines for successive units of time, of the items of an account both on an accrual and a cash basis including the current accrual units both debit and credit and the accrual balances both current and for the period to date, and the current cash transactions both debit and credit and the received/paid balance for the period to date.

7. A sheet for an account of income both on the accrual and cash basis which is appropriately divided and sub-divided into an earnings section with current time unit and period to date credit balance columns and a receipts section with the corresponding credit, debit and period to date credit balance columns.

8. A sheet for an account of income which is appropriately divided and sub-divided into an earnings section with current time unit credit balance, and period to date credit balance columns, a receipts section with credit, debit, and period to date credit balance, and a suspense section with unearned receipts credit balance columns.

9. A sheet for an account of a given classification of income which is appropriately divided and sub-divided into an earnings section with credit, debit, current time unit credit balance, adjustments, and period to date credit balance columns, a receipts section with credit, debit, and period to date credit balance columns, and a suspense section with earnings accrued receivable/unearned receipts balance column.

10. A sheet for an accrual account of income from time paper which provides appropriately designated columns in juxtaposed accrual and cash sections for the entry, on successive lines consecutively numbered for successive units of time, of the current debit accrual unit, the current credit accrual unit, the current accrual credit balance, the period to date accrual balance, the corresponding current total of income received, the current total of rebates, and the period to date balance of income received.

11. A sheet for an accrual account of income from time paper which provides appropriately designated columns for the entry, on successive lines consecutively numbered with the days of a month, of the accrual unit of paper which on that day begins to earn, the accrual unit of paper which on that day ceases to earn, the current accrual credit balance of said units, adjustments, if any, and the period to date accrual credit balance.

12. A sheet for an accrual account of income from time paper which provides horizontal spaces consecutively numbered for the days of a month and appropriately headed debit, credit, this day credit balance, adjustments, and period to date credit balance columns in an earned section, debit, credit, and credit balance column in a received section, and a suspense balance column in a suspense section.

13. A sheet for the register of discounts and loans on time paper and similar assets or liability accounts which has thereon, in addition to the usual columns, an appropriately designated column in which to enter the accrual unit of each item and the footings of such accrual units of all items registered and entered as usual on said sheet during given units of time.

14. A tickler or maturity sheet for discounts and loans on time paper and similar assets or liability accounts which has thereon, in addition to the usual columns, an appropriately designated column in which to enter opposite the usual entry of each item the accrual unit of said item and the footings or balance of such accrual units of all items so entered during given units of time.

15. A tickler or maturity sheet for time paper which comprises a sheet having attached thereto, rearranged to group together paper having the same maturity date, portions of a duplicate register sheet on which have been made the register entries of the same time paper and which has been divided to separate the enteries of paper having different maturity dates.

16. A tickler sheet for time paper which comprises portions of a register sheet of the same time paper on which have been entered the accrual unit of each paper, the portions of said register sheet being arranged on the tickler sheet to group together the different papers according to their maturity dates.

17. In an accrual system of accounting for income from time paper the method of preparing a tickler sheet which comprises preparing in duplicate a register sheet on which is entered the accrual unit of each paper taken and then cutting apart one of said duplicate register sheets to separate the paper or groups of paper having different maturity dates and attaching the parts grouped together according to maturity dates on the tickler sheet.

18. A new system of accounts, comprising a plurality of sheets for different classifications of income and expense each of which sheets is provided with accrual and cash sections having appropriately designated columns in which to carry, on successive lines for successive units of time, the items of an account both on an accrual and a received/paid basis.

19. A new system of accounts, comprising a plurality of sheets for different classifications of income and expense each of which sheets is provided with appropriately designated columns in which to keep in adjoining accrual, cash, and suspense sections respectively, and on successive lines for successive units of time, accrual, cash, and suspense accounts.

20. A new system of accounts, comprising a plurality of sheets for different classifications of income and expense each of which sheets is provided with appropriately designated columns in which to enter the debit and credit items of the account both on an accrual and a cash basis, on successive lines for successive units of time, in the accrual section both the accrual units of such items for the current time unit and the period to date balances of such accrual units and in the cash section both the corresponding debit and credit cash items for the current time unit and the period to date received/paid balances of such cash items.

21. A new system of accounts, comprising a plurality of sheets for different classifications of income and expense each of which sheets is provided with appropriately designated columns in which to enter, on successive lines for successive units of time, in an accrual section both the current time unit and the period to date accrual balances, in a cash section both the current time unit debit and credit cash items and the period to date received/paid balance, and in a suspense section the suspense balance.

22. A new system of accounts, comprising a plurality of sheets for different classifications of income and expense each of which sheets is provided with appropriately designated columns in which to enter, on successive lines for successive units of time, in an accrual section the current accrual units of the items of the account both debit and credit and the period to date balances of such accrual units and in a cash section the corresponding cash transactions both debit and credit and the received/paid balance of such cash transactions for the period to date.

23. A statement sheet for accrual accounts, which provides suitable parallel columns for the entry, opposite the different classifications of income and expense, and for the necessary footings, in an accrual section of the respective accrual balances both for a given time unit and for the period to date, in a cash section of the respective received/paid balances for the period to date, and in a suspense section of the respective suspense balances.

24. A statement sheet for accrual accounts, which provides appropriately designated columns for the entry, opposite the different classifications of income and of expense, and for the necessary footings, in an accrual section of the respective accrual balances both for a given time unit and for the period to date, in a cash section of the respective cash debit and credit items for the said time unit and the respective received/paid balances for the period to date, and in a suspense section of the respective suspense balances.

25. In a system of accrual accounting, means for a continuous automatic audit and control of a given classification of accounts comprising a sheet which is provided with appropriately designated columns in which to enter in horizontal alignment, on successive lines for successive units of time, in an accrual section the extended accrual balances of cash transactions both for the current time unit and for the period to date and in a cash section the said cash transactions both debit and credit for the current time limit and the extended cash balance for the period to date.

26. In a system of accrual accounting, means for a continuous automatic audit and control of certain classifications of accounts comprising a sheet for each of said classifications which is provided with appropriately designated columns for the entry, in juxtaposed accrual and cash sections and in horizontal alignment on successive lines for successive units of time, in the accrual section of the current accrual units of the cash transactions both debit and credit in a given classification and the extended accrual balances of such units both for the current time unit and for the period to date and in the cash section of the said cash transactions both debit and credit in said classification for the current time unit and the extended cash balance for the period to date.

27. In a system of accrual accounting, the combination of a plurality of sheets, a separate sheet for each of certain selected classifications of accounts, each of which sheets is provided with appropriately designated columns for the entry, in juxtaposed accrual and cash sections and on successive lines for successive units of time, in the accrual section of the accrual balances of the cash transactions in a given classification both for the current time unit and for the period to date and in the cash section of the said cash transactions in said classification both debit and credit for the current time unit and the cash balance for the period to date.

28. In a system of accrual accounting, the combination of a plurality of control sheets for income and expense accounts, a separate sheet for each classification of said accounts, some at least of which sheets are provided with appropriately designated columns for the entry, in juxtaposed accrual and cash sections and in horizontal alignment for a given unit of time, in the accrual section of the debit and credit accrual units of the debit and credit cash transactions in a particular classification for the current time unit and the extended balances of such accrual units both for the current time unit and for the period to date and in the cash section of the said debit and credit cash transactions in such classification for the current time unit and the extended cash balance for the period to date.

29. In a system of accrual accounting for income from the discount of time paper, the combination of a sheet which is provided with appropriate spaces for entering by given units of time both the total income received on all paper taken during each time unit and the accrual unit thereof, a second sheet which is provided with appropriate spaces for entering by the same units of time the accrual unit of all paper paid during each time unit, and a third sheet which is provided with appropriately designated columnar spaces for entering, in juxtaposed accrual and cash sections and in horizontal alignment for each successive time unit, in the accrual section as a credit the current accrual unit shown on the first sheet and as a debit the current accrual unit shown on the second sheet and the extended current and period to date credit balances of such accrual units and in the cash section as a credit the current total income received shown on the first sheet and as a debit the current total of cash rebates if any and the extended period to date balance of such cash items.

30. In a system of accrual accounting for income from the discount of time paper the combination of a register sheet which provides appropriate spaces for the entry, in addition to the usual data, of the established accrual unit of all paper discounted during given units of time, a tickler sheet which provides appropriate spaces for the entry, in addition to the usual data, of the established accrual unit of all paper paid during such units of time, and a control sheet which provides appropriate columnar spaces for the entry, in horizontal alignment for the same unit of time, in an income earned section of the current accrual unit from the register sheet as a credit, the current accrual unit from the tickler sheet as a debit, the extended current balance of said accrual units, and the extended period to date balance of said accrual units, and in an income received section the total income received on all paper discounted during the current time unit as a credit, the total cash rebates if any paid during the current time unit as a debit, and the extended period to date balance of said cash receipts and payments.

31. In a system of accrual accounting, the combination of a plurality of control sheets for certain given classifications of income and expense accounts, a separate sheet for each separate classification, which provide appropriate columnar spaces for the entry, in horizontal alignment by units of time, in an accrual section of the extended accrual balances in a particular classification both for the current time unit and for the period to date and in a cash section of both the debit and credit totals of cash transactions in said classifications for the current time unit and the extended period to date cash balance, and a statement sheet which provides appropriate columnar spaces for the entry opposite the different classifications of income and expense, and for the necessary footings, in an accrual section of the respective accrual balances both for a given time unit and for the period to date and in a cash section of the respective cash period to date balances as shown on the control sheets and in a suspense section of the respective suspense balances as established from the accrual and cash balances.

32. In an accrual system of accounting, the combination of a plurality of control sheets for certain given classifications of income and expense accounts which provide appropriate columnar spaces for the entry, in horizontal alignment by units of time, in an accrual section of the current credit and debit accrual units in a particular classification and the extended current and period to date balances of such accrual units and in a cash section of the current credit and debit cash transactions in said classification and the extended period to date balance of such cash transactions, and a statement sheet which provides appropriate columnar spaces for the entry, as of the close of any given time unit and in horizontal alignment opposite the different classifications of income and of expense, of the two accrual balances and of the cash balance shown respectively on the several control sheets and of the suspense balances of the respective classifications as established from the accrual and cash balances therein.

33. In a system of accrual accounting, the combination, with a general ledger providing an income and expense control account, of a plurality of control sheets for different classifications of income and expense accounts, all of which sheets provide appropriate columnar spaces for the entry on successive lines in horizontal alignment by units of time of the current time unit cash receipts and cash payments in a particular classification and the extended period to date cash balance and some at least of which sheets provide addition columnar spaces for the entry, in horizontal alignment with the corresponding cash entries, of the current time unit credit and debit accrual units in said classification and the extended current time unit and period to date balances of such accrual units, and a statement sheet which provides appropriate columnar spaces for the entry, as of the close of any given time unit and in horizontal alignment opposite the different classifications of income and of expense, of the cash balance and of the accrual balances if any shown respectively on the several control sheets and of the suspense balances of the respective classifications as established from such balances therein.

LEWIS A. FOOTE.